ved Nov. 14, 1961

3,008,818
METHOD OF INCREASING YIELD OF MINT OIL
Durward O. Guth, 7828 Sunset Ave., Elmwood Park, Ill.
No Drawing. Filed June 20, 1957, Ser. No. 667,048
1 Claim. (Cl. 71—2.6)

The instant invention relates to the regulation of the growth of plants. More particularly, it relates to methods and compositions for increasing the yield of desired components of plants.

In the science of plant physiology, many growth stimulants, promoters, and regulants are known which are responsible for the manner in which plant life develops. These substances, when applied in small quantities, promote or control, the growth and/or health of plants.

In the successful application of plant regulants, it has been important that the concentration of the compound applied and the time of treatment be carefully controlled because these factors are generally highly critical. If one or both of these factors, depending upon the particular plant regulant employed, is exceeded by using a greater concentration or longer treating time, the desired effect may completely vanish and instead the plant is severely damaged.

In applying most of these regulants, there is little or no margin of safety for an unskilled workman.

It is an object of the instant invention to provide a method for regulating the growth of plants without danger of decreasing the yield of the desired component of the plant.

It is a further object of the instant invention to provide methods for increasing the yield of a desired component from a plant without need of adding or increasing fertilization.

It is a further object of the instant invention to provide a method for increasing the yield of mint oil from plants from which it is recovered.

These and other objects of the instant invention will be fully understood from the following description.

I have found that compositions containing as essential ingredients the 2,3,6-trichlorobenzoyl group and potassium have plant growth stimulating properties when applied thereto. When applied to crops which produce mint oil, it about doubled the yield of oil recovered therefrom, while other factors affecting the growth of plants were held substantially constant. In addition, the instant composition can be applied with success over a wide range of concentration with little chance of damaging the plant so as to decrease the yield.

The following example illustrates a typical embodiment of the instant invention:

A composition was prepared from 1 lb. 2,3,6-trichlorobenzoic acid, 0.3 lb. potassium hydroxide (approximately), and 25 gallons of water.

One pound of 2,3,6-trichlorobenzoic acid was mixed with about 5 gallons of water to obtain a paste. The potassium hydroxide was dissolved in about 5 gallons of water and was added to the acid paste to obtain a pH of between about 7.5 and about 8.0. For use the resulting mixture was diluted with water to obtain about 25 gallons of the solution.

This yield-improving composition is sprayed uniformly over one acre of land including the foliage of the crop. This is a concentration of 1 lb. per acre of the 2,3,6-trichlorobenzoic acid in 25 gallons of water.

As a more specific example, the above composition was sprayed over an acre of plants producing mint oil, which was adjacent another acre of mint plants used as a control and which was treated in the same manner except for the use of the instant yield-improving composition. Both acres were hand weeded and harvested in the early bloom stage according to conventional commercial practice. The resulting hay from both acres was processed and steam distilled in the normal manner. The untreated acre produced a yield of 35 lbs. of spearmint oil. The acre treated with the instant composition produced 69 lbs. of the oil.

The instant plant regulant has the advantage that it can be applied to crops over a wide range of concentration to obtain improved yields. For example, improved yields of mint oil were obtained when about ½ lb. per acre and when about 4 lbs. per acre of the 2,3,6-trichlorobenzoic acid were used. The term "crops" is used herein in a broad sense to mean plants which are cultivated or growing in a desired location, and include field crops, legumes, and horticultural crops.

In practicing the invention, it is sometimes preferred to incorporate a chelating agent in the composition. The reason for this is that hard water is preferred for use in preparing the solutions of the regulant. Artificially soft or softened water contains a rather substantial number of sodium ions because of the softening process, and these interfere with the action of the regulant. The chelating compound is incorporated into the instant composition, preferably in amount ranging from 1½ to about 50 times that necessary to take care of the hardness in the water, or expressed in other terms, in amounts ranging from .05 mol to about 1 mol per mol of the 2,3,6-trichlorobenzoyl radical in the solution.

The chelating agent, which may also be a buffer, functions to prevent substantial alteration of the composition because of the hardness of the water. Chelating compounds are well known in the art, and a typical one suitable for incorporating into the composition of the above example is about 0.3 lb. of ethylene diamine tetraacetic acid.

In preparing the instant composition, a sufficient amount of potassium-containing compound is added to provide a molar equivalent to combine with the 2,3,6-trichlorobenzoic acid and to produce the potassium salt of the acid. Although the trichloro salt is the preferred halogen derivative, the 2,3,6-tribromo derivative of the acid may alternatively be employed. The 2,3,6-trichlorobenzoic acid can be combined with any water-soluble potassium salt, such as potassium carbonate or acetate in order to obtain the potassium salt. If desired, a molar excess of potassium, for example up to about 3 times the molar equivalent, can be employed. Generally it is preferred that the composition have a pH of about 8.0 and, if necessary, the pH of the solution can be adjusted with a suitable reagent.

Although it is usually most convenient to spray the instant compositions on the foliage of the crops, if desired, they may be applied by any other well known means, either to the foliage or to the soil or root media.

The instant compositions function to improve the yield obtainable at different levels of soil fertility, but use of the compositions does not prohibit use of fertilizers, plant foods or nutrients to further increase the yield by providing a more proper food for the plant. However, no change in the fertility level of the soil or root media need be made in order to obtain improvement in the yield of crop. The reason for this is that the instant composition is a hormone-like biological agent which modifies the development of the plant and controls the growth characteristics rather than, as in the case of fertilizers, providing more proper nutrition for the plant.

The precise manner in which the instant compositions function is not known. It is probable that the increase in yield of the economically valuable constituent, such as mint oil, is due to any one or a combination of the following factors: auxin action, destruction of disease, and increased resistance to disease.

If the compositions function as a plant auxin, they may stimulate the activity of the plant cells including those which produce the mint oil, or they may cause increase of the total weight of these cells per plant. On the other hand, the compositions may increase the yield of mint by destroying the wilt disease, a fungus infection endemic in the soil, and healthy plants produce a better yield than sick plants. Or the compositions may alter the biology or constitution of the plant to make it more resistant to disease such as wilt.

In the fields of mint crop described in the above example, the plants appeared normal and there were no signs of any wilt infection. Therefore, it would appear that the improved yield is due to the stimulation and/or modification of the growth pattern of healthy plants. However, it is understood that the invention is not dependent upon this theory of the action of the instant compositions in the plant.

In summary, I have discovered methods and compositions for regulating the growth of crops, such as mint-producing crops, which results in a substantial increase in the yield of a desired crop constituent. The instant compositions containing molar equivalents of potassium and of 2,3,6-trichlorobenzoic acid are easy to apply and are effective over a wide range of concentration.

While the invention is described in connection with the use of the potassium salt of 2,3,6-trichlorobenzoic acid, there are other materials that similarly alter the growth habit of plants and increase the yield of the wanted component. The potassium salts have the desirable characteristic of producing more gentle reactions in the foliage and a more uniform reaction throughout the plant. I have used other adjunctive agents to render the 2,3,6-trichlorobenzoic acid more readily assimilated by the plant. Other halogenated benzoic acids also are effective. In particular, 2,3,5,6-tetrachlorobenzoic acid produces good results.

Having fully described and illustrated the character of the instant invention, what is desired protected by Letters Patent is:

A method for increasing the quantity of mint oil recoverable from an acre of mint crop, which comprises treating an acre of growing mint plants with about 25 gallons of water containing about a pound of potassium salt of material selected from the group consisting of 2,3,6 - trichlorobenzoic acid; 2,3,6 - tribromobenzoic acid; 2,3,5,6-tetrachlorobenzoic acid; 2,3,5,6-tetrabromobenzoic acid; and mixtures of more than one thereof.

References Cited in the file of this patent

UNITED STATES PATENTS

| | | |
|---|---|---|
| 2,394,916 | Jones | Feb. 12, 1946 |
| 2,606,830 | Kamlet | Aug. 12, 1952 |
| 2,848,470 | Girard et al. | Aug. 19, 1958 |

FOREIGN PATENTS

| | | |
|---|---|---|
| 785,989 | Great Britain | Nov. 6, 1957 |

OTHER REFERENCES

Zimmerman et al. in "Contributions from Boyce Thompson Institute," vol. 16, #5, January 1950, pages 209–213.

Malandrino in "Chemical Abstracts," vol. 45, col. 6700(i), 1951.

Zimmerman et al. in "Industrial and Engineering Chemistry," vol. 35, #5, May 1943, pages 596–601.